United States Patent
Suzuki et al.

(10) Patent No.: US 8,431,262 B2
(45) Date of Patent: Apr. 30, 2013

(54) SAFETY VALVE AND MANUFACTURING METHOD THEREOF, SEALED BATTERY AND MANUFACTURING METHOD THEREOF, VEHICLE, AND BATTERY MOUNTING DEVICE

(75) Inventors: Satoshi Suzuki, Toyota (JP); Kenji Okazaki, Toyota (JP); Satoru Kato, Toyota (JP); Motoichi Nakayama, Toyota (JP); Yoshinobu Wada, Seto (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 349 days.

(21) Appl. No.: 12/740,415

(22) PCT Filed: May 26, 2009

(86) PCT No.: PCT/JP2009/059562
§ 371 (c)(1),
(2), (4) Date: Apr. 29, 2010

(87) PCT Pub. No.: WO2010/087040
PCT Pub. Date: Aug. 5, 2010

(65) Prior Publication Data
US 2011/0269000 A1    Nov. 3, 2011

(30) Foreign Application Priority Data
Jan. 27, 2009    (JP) .................................. 2009-015174

(51) Int. Cl.
H01M 2/12    (2006.01)
(52) U.S. Cl.
USPC .......................................................... 429/56

(58) Field of Classification Search ..................... 429/56
See application file for complete search history.

(56) References Cited

U.S. PATENT DOCUMENTS
6,432,572 B1 *  8/2002  Yoshida et al. ................. 429/56

FOREIGN PATENT DOCUMENTS

| JP | 1-309253 |   | 12/1989 |
|----|----------|---|---------|
| JP | 7-169452 |   | 7/1995  |
| JP | 11-204093 |   | 7/1999  |
| JP | 2001-23595 |   | 1/2001  |
| JP | 2001266804 A | * | 9/2001 |
| JP | 2002025525 A | * | 1/2002 |
| JP | 2005-38709 |   | 2/2005  |
| JP | 2005-235531 |   | 9/2005  |
| JP | 2008-235082 |   | 10/2008 |
| JP | 2008-251438 |   | 10/2008 |

* cited by examiner

*Primary Examiner* — Gregg Cantelmo
(74) *Attorney, Agent, or Firm* — Finnegan, Henderson, Farabow, Garrett & Dunner, LLP

(57) ABSTRACT

A safety valve of the invention including a cleavable groove is provided in a battery case of a sealed battery containing a power generating element inside. The cleavable groove is partly formed with a measuring groove having a width wider than other portions. Even if other portions of the cleavable groove have fairly small groove width, a groove width of the cleavable groove can be obtained and determined the quality by measuring a groove width of the measuring groove. Thereby, a safety valve and a manufacturing method thereof, a sealed battery and a manufacturing method thereof, a vehicle, and a battery mounting device are provided to achieve less variation of valve opening pressure and stable product quality, as well as reliably assure the good quality.

1 Claim, 6 Drawing Sheets

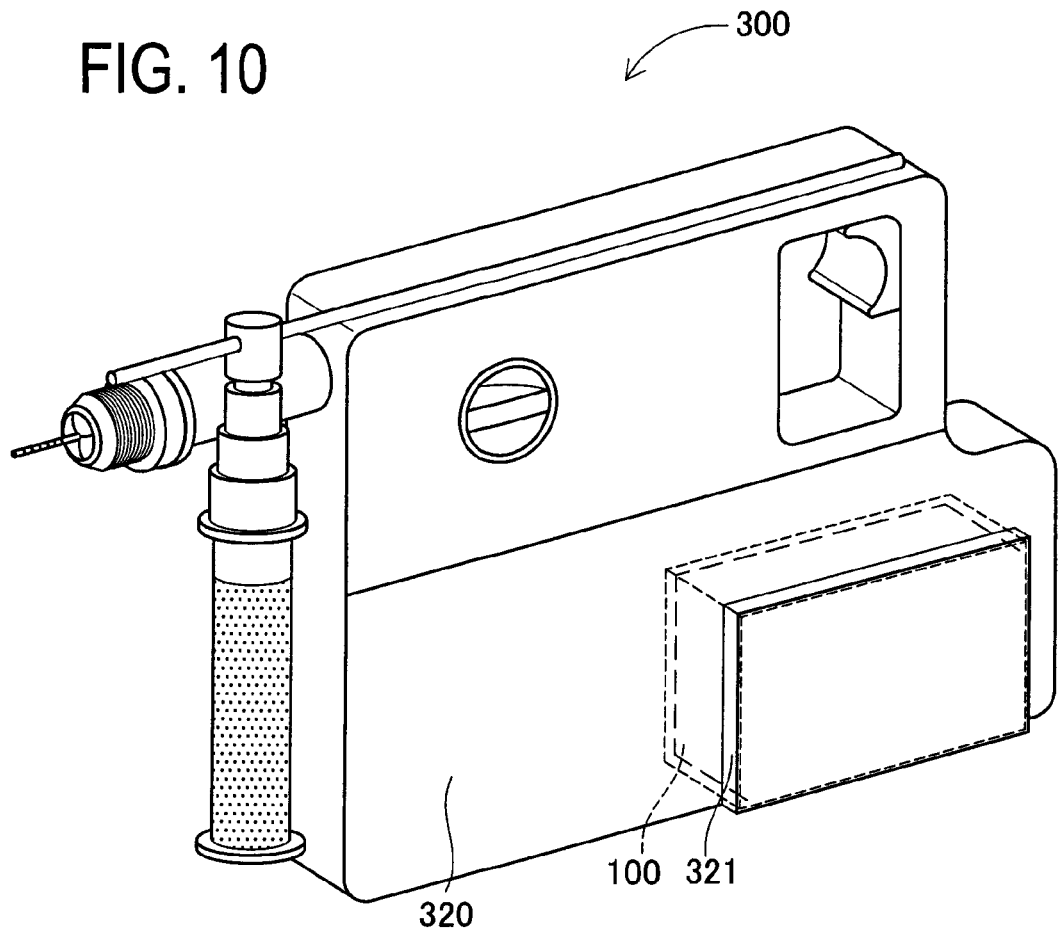

SAFETY VALVE AND MANUFACTURING METHOD THEREOF, SEALED BATTERY AND MANUFACTURING METHOD THEREOF, VEHICLE, AND BATTERY MOUNTING DEVICE

CROSS-REFERENCE TO RELATED APPLICATIONS

This application is a national phase application of International Application No. PCT/JP2009/059562, filed May 26, 2009, and claims the priority of Japanese Application No. 2009-015174, filed Jan. 27, 2009, the contents of both of which are incorporated herein by reference.

TECHNICAL FIELD

The present invention relates to a safety valve that cleaves (split opens) when inner pressure of a battery rises and a manufacturing method of the safety valve. Further, the invention also relates to a sealed battery formed with a safety valve and a manufacturing method thereof, a vehicle that mounts the sealed battery, and a battery mounting device that mounts the sealed battery. More particularly, the invention relates to a safety valve formed with a cleavable groove formed in a valve portion by pressing and a manufacturing method of the safety valve, a sealed battery and a manufacturing method thereof, a vehicle, and a battery mounting device.

BACKGROUND ART

Heretofore, some sealed batteries are provided with safety valves on outer peripheral surfaces of the batteries. The safety valve opens when pressure inside the battery rises and exceeds a tolerable level. The safety valve thus serves as an opening for discharging gas and others existing inside the battery. Accordingly, a valve opening pressure is desired to be at a target level.

There has been proposed in Patent Literatures 1 and 2 that a safety valve has, for example, a thin-wall portion and the thin-wall portion is internally formed with a thin grooved portion. For obtaining such a safety valve with stable product quality, it is desirable to make the groove width narrow. This is because larger groove width could result in unevenness of the valve opening pressure.

CITATION LIST

Patent Literature
  Patent Literature 1: JP 11-204093A
  Patent Literature 2: JP2008-235082A

SUMMARY OF INVENTION

Technical Problem

However, the above mentioned conventional safety valve has a problem that measurement of the groove depth becomes difficult when the groove width is fairly small. The wall thickness of the grooved portion has to be measured for checking whether the valve opening pressure is appropriate. Further, for measuring the wall thickness by way of a nondestructive test, the value of a groove depth of the grooved portion has to be precisely obtained. On the other hand, when the groove depth of the grooved portion having fairly small groove width is measured by use of laser light, the depth can not be precisely measured because the irradiated laser light could scatter on a side wall surface defining the grooved portion. Furthermore, measurement by use of a contact probe could also fail because production of a very fine probe itself is extremely difficult. Moreover, it is hard to position the probe at a portion to be measured. As a result, the groove depth can not be precisely measured in the safety valve having the fairly small groove width. In other words, there is a problem that the quality of the safety valve is not reliably assured.

The present invention has been made to solve the problems of the above conventional technique. Specifically, a purpose of the invention is to provide a safety valve and a manufacturing method thereof, a sealed battery and a manufacturing method thereof, a vehicle, and a battery mounting device, each capable of reducing unevenness of valve opening pressure and stabilizing product quality as well as reliably assuring the good quality of the safety valve, the sealed battery, the vehicle, and the battery mounting device.

Solution to Problem

According to one aspect of the present invention to solve the above problems, a safety valve includes a cleavable groove, the safety valve being to be provided in a battery case of a sealed battery containing a power generating element inside, wherein the cleavable groove is partly formed with a measuring groove having a width wider than other portions of the cleavable groove.

According to the above safety valve, the cleavable groove is partly formed with the measuring groove. The measuring groove has a width wider than other portions of the cleavable groove. Hence, a groove depth of the measuring groove can be measured by a known measuring method such as irradiation of laser light, for example. Further, portions other than the measuring groove in the cleavable groove may have such narrow groove width as to make measurement of the depth of the groove more difficult. Consequently, the safety valve can achieve less variation of the valve opening pressure and stable product quality by the cleavable groove having portions other than the measuring groove, as well as reliably assure the good quality by measurement of the depth of the measuring groove.

In the above safety valve, it is preferable that the measuring groove is provided at each of plural points of the cleavable groove.

This configuration makes it possible to conduct measurement at several points in the longitudinal direction of the cleavable groove. Even when the cleavable groove is formed oblique with respect to the depth (vertical) direction, the depth can be comprehensively estimated. Therefore, the good quality of the safety valve is more reliably assured.

Another aspect of the invention is to provide a manufacturing method of a safety valve provided in a battery case of a sealed battery containing a power generating element inside, the method comprising: a first step of forming a cleavable groove and a measuring groove as a part of the cleavable groove, the measuring groove having a width wider than other portions of the cleavable groove, by pressing by use of a die having a protrusion for forming the cleavable groove, the protrusion including a wider portion compared to other portions; a second step of measuring a depth of the measuring groove; and a third step of determining the quality of the safety valve in a way that the safety valve is determined non-defective if the depth of the measuring groove obtained in the second step is within a predetermined range and determined defective and rejected if the depth is out of the predetermined range.

According to the above manufacturing method of the safety valve, in the first step, the cleavable groove and the measuring groove are formed simultaneously. In the second step, the groove depth of the measuring groove is measured. Since the grooves are simultaneously formed by use of a single die, the groove depth of the cleavable groove is also known by measuring the groove depth of the measuring groove. Moreover, based on a measurement result in the second step, the safety valve is determined whether or not non-defective in the third step. In a case that the safety valve is determined defective, the valve is rejected. Accordingly, the safety valve is reliably assured its good quality.

In the above manufacturing method of the safety valve, furthermore, it is preferable that the first step uses the die including the protrusion formed with the wider portion at each of plural points of the protrusion, the second step includes measuring depth of the measuring groove formed at each of the plural points, and the third step includes determining the safety valve non-defective if the depths of the measuring groove at each of the plural points are all within the predetermined range and a difference between the depths of the measuring grooves is equal to or lower than a predetermined upper limit while determining the safety valve defective and rejecting it if at least one of the depths is out of the predetermined range or the difference exceeds the upper limit. This configuration can easily reject a safety valve formed with a cleavable groove of which a depth is partly out of the tolerable level due to inclination of the die.

Another aspect of the invention provides a sealed battery containing a power generating element in a battery case, wherein the battery case includes a safety valve provided with a cleavable groove, the cleavable groove is partly formed with a measuring groove having a width wider than other portions of the cleavable groove.

In the above sealed battery, it is preferable that the measuring groove is provided at each of plural points of the cleavable groove.

Another aspect of the invention further provides a manufacturing method of a sealed battery containing a power generating element in a battery case including a safety valve, the method comprising: a first step of forming the safety valve by forming a cleavable groove and a measuring groove as a part of the cleavable groove, the measuring groove having a width wider than other portions of the cleavable groove by pressing by use of a die having a protrusion for forming the cleavable groove, the protrusion including a wider portion compared to other portions; a second step of measuring a depth of the measuring groove; and a third step of determining the quality of the safety valve in a way that the safety valve is determined non-defective if the depth of the measuring groove obtained in the second step is within a predetermined range and determined defective and rejected if the depth is out of the predetermined range.

In the above manufacturing method of the sealed battery, it is preferable that the first step uses the die including the protrusion formed with the wider portions at each of plural points of the protrusion, the second step includes measuring depth of the measuring groove formed at each of the plural points, and the third step includes determining the safety valve non-defective if the depths of the measuring groove at each of the plural points are all within the predetermined range and a difference between the depths of the measuring grooves is equal to or lower than a predetermined upper limit while determining the safety valve defective and rejecting it if at least one of the depths is out of the predetermined range or the difference exceeds the upper limit.

Furthermore, another aspect of the present invention provides a vehicle that mounts the sealed battery having the above features and a battery mounting device that mounts the sealed battery having the above features.

Advantageous Effects of Invention

According to the safety valve and the manufacturing method thereof, the sealed battery and the manufacturing method thereof, the vehicle and the battery mounting device as above mentioned, a safety valve can achieve less variation of the valve opening pressure and stable product quality as well as reliably assure the good quality.

BRIEF DESCRIPTION OF DRAWINGS

FIG. 10 is an explanatory view showing a hammer drill using the secondary batteries in the embodiment.

DESCRIPTION OF EMBODIMENTS

A detailed description of a preferred embodiment of the present invention will now be given referring to the accompanying drawings. In this embodiment, the invention is applied to a safety valve formed in a case of a lithium ion secondary battery having a flat rectangular shape.

Figure 1:
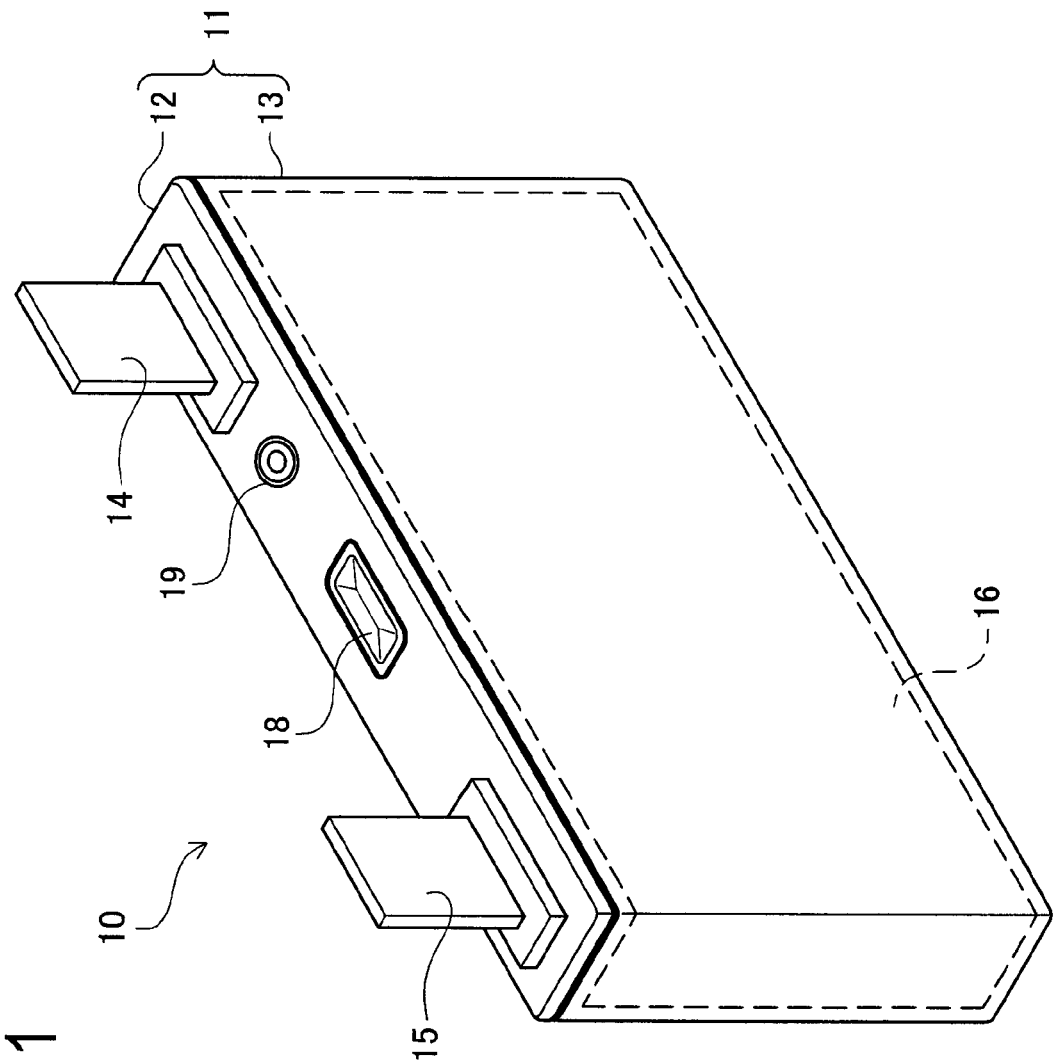
FIG. 1 is a perspective view of a secondary battery provided with a safety valve according to an embodiment.

A secondary battery 10 in this embodiment is configured such that a power generating element 16 is contained in a battery case 11 as shown in FIG. 1. The battery case 11 has a box-shaped case body 13 having an open face and a closing plate 12 that closes the open face. On the upper side of the closing plate 12 in the figure, a positive terminal 14 and a negative terminal 15 each serving as an external electrode terminal are attached to protrude. Those positive terminal 14 and negative terminal 15 are respectively connected to positive and negative electrode plates and others included in the power generating element 16. A safety valve 18 and a liquid pouring part 19 are formed in the closing plate 12 of the battery case 11 between the terminals 14 and 15.

Figure 2:
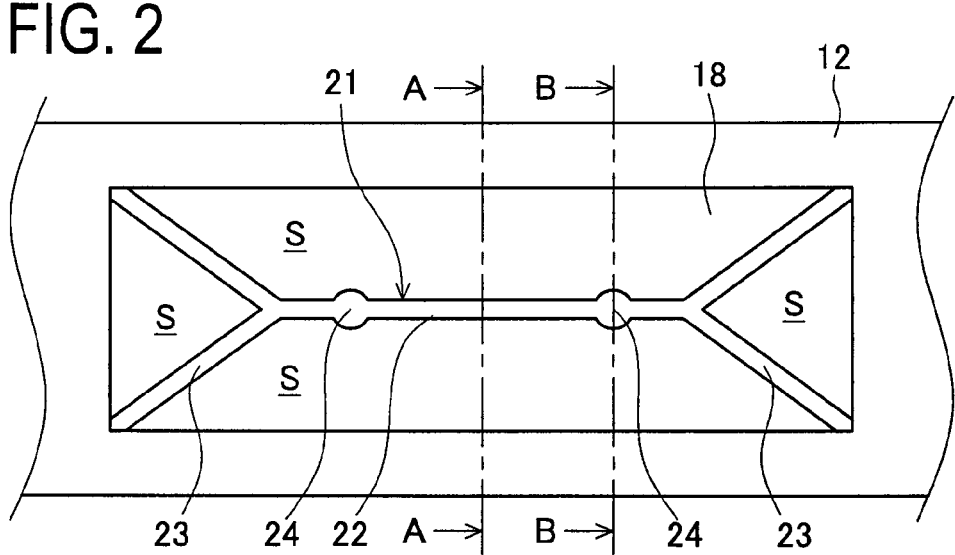
FIG. 2 is a plan view of the safety valve.
Figure 3:
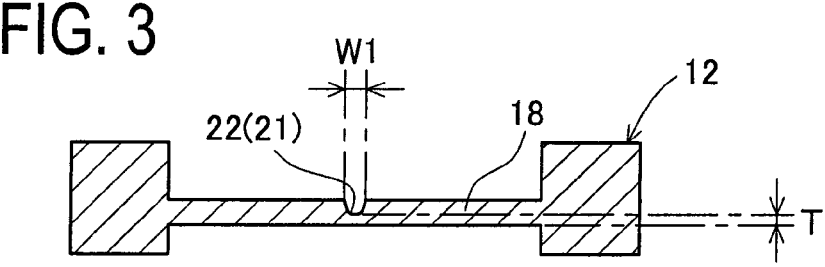
FIG. 3 is a sectional view of the safety valve.
Figure 4:
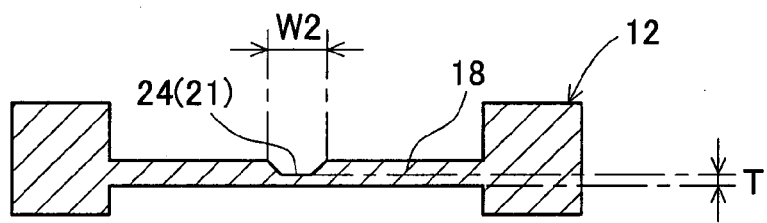
FIG. 4 is a sectional view of the safety valve.

A part of the closing plate 12 where the safety valve 18 is provided is shown in FIGS. 2, 3, and 4 in detail. FIG. 2 is a plan view of the safety valve 18 and its surrounding area. FIG. 3 is a sectional view taken along a line A-A in FIG. 2. FIG. 4 is a sectional view taken along a line B-B in FIG. 2. The safety valve 18 is a thin plate-like portion having an almost rectangular outer shape in planar view. In the present embodiment, the safety valve 18 is integrally formed in the closing plate 12 thereof. Further, the case body 13 and the closing plate 12 of the battery case 11 are both made from metal plate such as aluminum or steel.

The safety valve 18 of this embodiment is, as shown in FIGS. 3 and 4, is a portion designed thinner in whole compared to the closing plate 12 surrounding the safety valve 18. Moreover in this embodiment, as shown in FIG. 2, the safety valve 18 is formed with a cleavable groove 21 shaped like two continuous Y-shaped grooves being inversely placed and connected with their leg portions. The cleavable groove 21 is a recessed portion formed in the safety valve 18 as shown in FIGS. 3 and 4.

The cleavable groove 21 in this embodiment has a center groove 22 extending in a longitudinal direction of the closing plate 12 and four oblique grooves 23 each extending radially from both ends of the center groove 22 toward four corners of the safety valve 18 as shown in FIG. 2. Furthermore, the center groove 22 partly includes measuring grooves 24 each having a groove width wider than other portions. The measuring grooves 24 are portions of almost circular shape that are provided in two positions separated from each other in the longitudinal direction of the center groove 22.

The safety valve 18 is to cleave for releasing gas when inner pressure of the secondary battery 10 excessively rises during the use. Therefore, the inner pressure (valve opening pressure) for cleaving is desired to be within an appropriate range. This cleaving action generally starts from the center groove 22. Subsequently, four portions S other than the cleaving groove 21 of the safety valve 18 are deformed to curl up outwardly outside the battery case and thus opened.

In order to obtain a valve the valve opening pressure of which within the appropriate range, a thickness of the cleavable groove 21, especially the wall thickness of the safety valve 18 at the deepest portion of the center groove 22 may be within the appropriate range. Accordingly, as shown in FIGS. 3 and 4, the wall thickness (hereinafter, referred to as a groove thickness) T of the center groove 22 is set to be within the appropriate range based on a correlation with a pressure receiving area of the safety valve 18. It is unfavorable if the groove thickness T of the cleavable groove 21 is too large or too small. In this embodiment, the groove thickness T of the cleavable groove 21 is about a several tens of micrometers, for example.

Moreover, when the groove width of the center groove 22 is fairly small, more stable valve opening pressure having less variation can be obtained. In the present embodiment, a groove width W1 (an opening width, see FIG. 3) of the center groove 22 is as very small as, for example, about a several tens of micrometers. Therefore, it is extremely difficult to measure the groove depth of this portion by use of for example laser light.

On the other hand, as shown in FIG. 4, a groove width W2 of the measuring groove 24 is designed especially large as opposed to other portions of the cleavable groove 21. The groove width W2 of the measuring groove 24 in this embodiment is 300 to 1000 μm in an opening width for example. Further, a groove bottom is flat and a width of the groove bottom is formed considerably wider than the width of the center groove 22. With this configuration, it is possible to precisely measure the groove depth by irradiating the laser light to the groove bottom of the measuring groove 24 from above in the figure and receiving the reflection light. A length of the measuring groove 24 in the groove longitudinal direction (length in the lateral direction in FIG. 2) is almost same as the groove width W2 (specifically within twice the groove width W2). As long as the center groove 22 has such the wide width, stability of the valve opening pressure can be assured. In addition, each groove width of the four oblique grooves 23 is similar to that of the center groove 22.

A method of manufacturing the safety valve in the present embodiment will be explained below. This manufacturing method includes the following four steps. Specifically, the steps are: (1) a flatly pressing step of forming a portion to be shaped as the safety valve 18 in the closing plate 12; (2) a groove pressing step of forming the cleavable groove 21 in a predetermined portion; (3) a measuring step of obtaining a depth of the cleavable groove 21; and (4) a determining step of determining the quality of the formed cleavable groove 21. In these steps, the groove pressing step (2) corresponds to a first step, the measuring step (3) corresponds to a second step and the determining step (4) corresponds to a third step, respectively.

Firstly, in the pressing step (1), a part of the closing plate 12 is pressed flatly by a press to form a portion to be served as the safety valve 18. For example, flat dies each having the same size with the safety valve 18 are placed on front and back faces of the closing plate 12 and pressed from above and below. Thereby, the portion to be the safety valve 18 shown in FIG. 2 is made thinner than other peripheral portions. This method enables portions except the cleavable groove 21 of the safety valve 18 to have almost uniform plate thickness. In addition, this plate thickness is set to a predetermined one.

Figure 5:
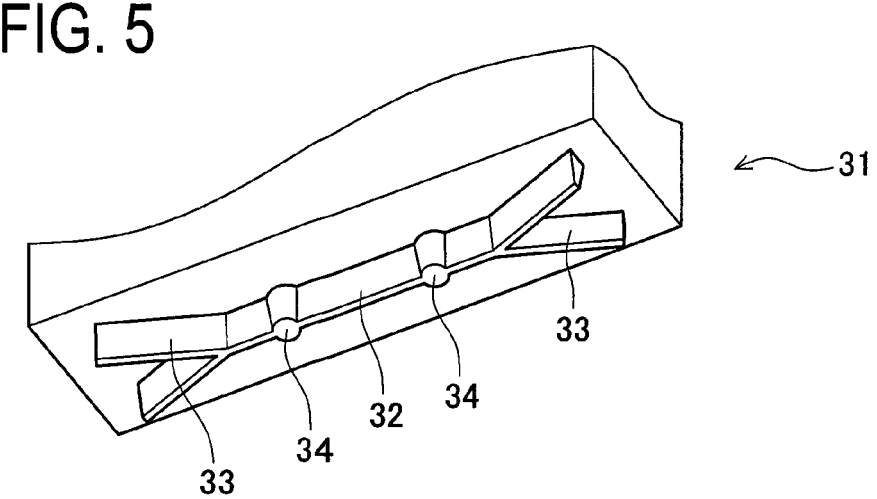
FIG. 5 is an explanatory view showing an example of a punch for forming a cleavable groove.

Secondly, in the groove pressing step (2), the cleavable groove 21 as a whole is formed by a single pressing. Specifically, by use of a punch 31 formed with a protrusion having the same shape as the cleavable groove 21 and uniform height, as shown in FIG. 5, the pressing is conducted inside the portion pressed in the step (1). The punch 31 includes a center protrusion 32 for forming the center groove 22, oblique protrusions 33 for forming the oblique grooves 23, and measuring protrusions 34 for forming the measuring grooves 24, these protrusions being continuously formed and having the same height. Accordingly, all of the center groove 22, the oblique grooves 23, and the measuring grooves 24 are formed at the same time.

Thus configured punch 31 enables the groove thickness T to be uniform in any portion in the cleavable groove 21 at least from a point of designing view. Specifically, if the safety valve 18 and the punch 31 are placed in parallel each other during pressing, the depth of the cleavable groove 21 in whole can be made uniform. However, the pressing is conducted while the safety valve 18 and the punch 31 are not parallel with each other, the groove thickness T could be slightly different between portions of the cleavable groove 21.

Figure 6:
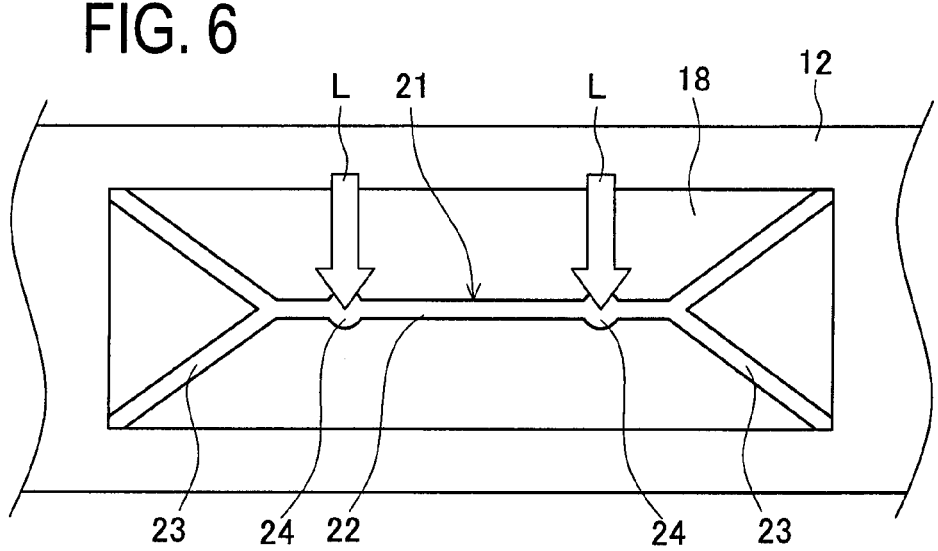
FIG. 6 is an explanatory view showing an example of measurement using laser light.

In the measuring step (3), the groove thickness T of the cleavable groove 21 formed in the groove pressing step (2) is measured. For measuring, as shown in FIG. 6, laser light L is irradiated on the two measuring grooves 24 to measure the depth of a groove bottom. The measuring groove 24 has the groove width W2 wide enough to allow measurement using the laser light. Accordingly, the laser light L is hardly scattered by a side wall of the groove. Therefore, highly precise measurement is possible by the laser light L. Since the plate thickness of a portion of the safety valve 18 other than the cleavable groove 21 has been given in the pressing step (1), the groove thickness T of the measuring groove 24 can be obtained.

Subsequently, in the determining step (4), it is determined whether or not the thus formed cleavable groove 21 is non-defective from the result of the measuring step (3). In this embodiment, a preferable range of the groove thickness T is stored in advance. Then, it is determined whether the groove thickness T obtained in the measuring step (3) is within the preferable range. When the groove thickness T of at least one of the two measuring grooves 24 is determined to be out of the preferable range, the cleavable groove 21 is determined to be defective. When the cleavable groove 21 is defective, the closing plate 12 including such the safety valve 18 is rejected and not used in manufacturing the secondary battery 10.

On the other hand, when the groove thickness T of the two measuring grooves 24 are both within the preferable range, the difference of the groove thickness T between the two measuring grooves 24 is calculated. Thereby, it is possible to find inclination of the bottom surface of the cleavable groove 21 caused by the non-parallel relation between the punch 31 and the closing plate 12 during the pressing. This is because if the punch 31 and the closing plate 12 are not placed in parallel during the pressing, the groove thickness T of the portion other than the measuring grooves 24 (in the vicinity of the right and left ends of the cleaving groove 21 in the FIG. 6) could be out of the preferable range even if the groove thickness T of the two measuring grooves 24 is within the preferable range.

Consequently, in this embodiment, a tolerable range of the difference of the groove thickness T of the two measuring grooves 24 is also stored in advance. If the obtained difference is within this tolerable range, the cleavable groove 21 is determined to be good. If the difference is out of the range, the cleavable groove 21 is determined to be defective. Further, if the cleavable groove 21 is defective, the closing plate 12 including such the safety valve 18 is rejected and not used in manufacturing the secondary battery 10.

The closing plate 12 determined to be non-defective at this determination also is further forwarded to the next step and used for manufacturing the secondary battery 10. To be concrete, the power generating element 16 is contained in the case body 13 of the battery case 11 and closed with the non-defective closing plate 12. Thereby, the secondary battery 10 provided with the safety valve 18 of good quality can be manufactured. With this configuration, it is possible to determine whether the whole groove thickness T of the cleavable groove 21 is within the preferable range even if the measurement is conducted only on two points of the cleavable groove 21. Therefore, the safety valve 18 and the secondary battery 10 can be manufactured with reducing unevenness of the valve opening pressure and achieving stable product quality.

Namely, in this embodiment, the cleavable groove 21 is determined non-defective if both the groove thicknesses T measured on the two measuring grooves 24 are within the predetermined range and also the difference between the two measured groove thicknesses T is within the predetermined range. However, if at least one of the groove thicknesses T of the measuring grooves 24 is out of the predetermined range or the difference exceeds the predetermined range, the cleavable groove 21 is determined defective. In addition, instead of the measurement using the laser light L, contact measurement using a probe can be adopted for the same determining operation. In accordance with the measuring method, the groove width W2 and the length of the measuring groove 24 may be changed as appropriate.

Figure 7:
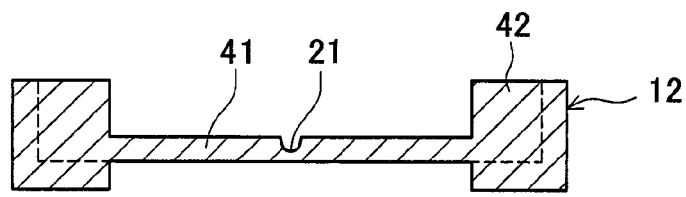
FIG. 7 is a sectional view of another configuration of a safety valve.

In this embodiment, the closing plate 12 is integrally formed with the safety valve 18. Alternately, as shown in FIG. 7, a safety valve 41 may be formed as a separate member 42. The separate member 42 formed as the safety valve 41 may be mounted in the closing plate 12 by welding, for example. In this case, the safety valve 41 and the cleavable groove 21 are formed in the separate member 42 in advance and the thus configured separate member 42 may be fixed to the closing plate 12. An alternative is to first mount the safety valve 41 in the closing plate 12 and then form the cleavable groove 21.

According to the safety valve 18 in the present embodiment explained above in detail, since the measuring grooves 24 are formed in the cleavable groove 21, the groove thickness T at each position of the measuring grooves 24 can be highly precisely measured. Moreover, the two measuring grooves 24 are provided separately from each other, so that the inclination of the die inclined when the groove is formed can be estimated from the difference between the measurement results of the two measured points. Consequently, in all the positions of the cleavable groove 21 including the both ends of the center groove 22 and the oblique grooves 23, the groove thickness T can be determined whether or not to be within the tolerable range. Further, the groove width of the portions other than the measuring grooves 24 is fairly small. Accordingly, the variation of the valve opening pressure is restricted to small. Therefore, the safety valve can achieve less variation of the valve opening pressure and stable product quality, as well as reliably assure the good quality.

Figure 8:
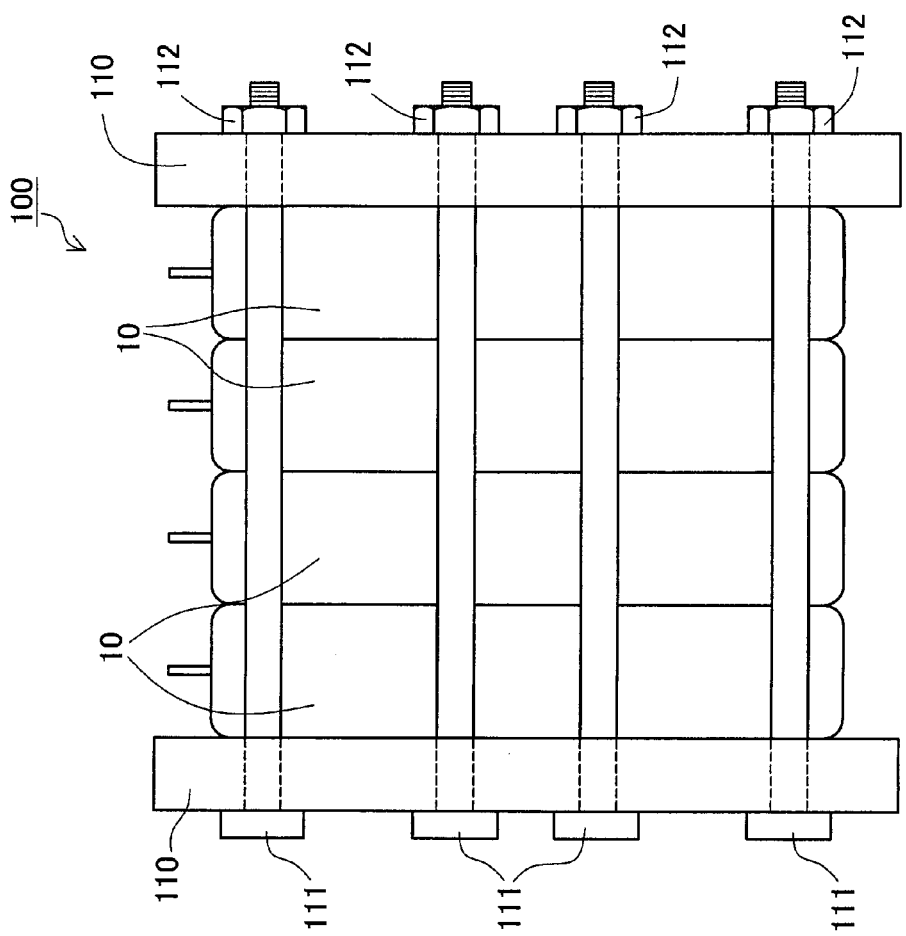
FIG. 8 is a side view of a battery pack using secondary batteries in the embodiment.

The following explanation is given to a usage example in which the secondary battery 10 in the present embodiment is mounted in various devices. For example, as shown in FIG. 8, a plurality of secondary batteries 10 is used to produce a battery pack 100. The secondary batteries are arranged so that their external electrode terminals are disposed on the same side and the side surfaces (having a large surface area) of the adjacent secondary batteries 10 are placed in contact with each other. Binding plates 110 are placed on both sides and tightened with binding screws 111 and nuts 112. Thus, the secondary batteries 10 bound under a binding pressure appropriate for use can be used. Furthermore, the positive terminal 14 and the negative terminal 15 of each secondary battery 10 are sequentially connected in series to form the battery pack 100. This battery pack 100 will be mounted in various devices.

Figure 9:
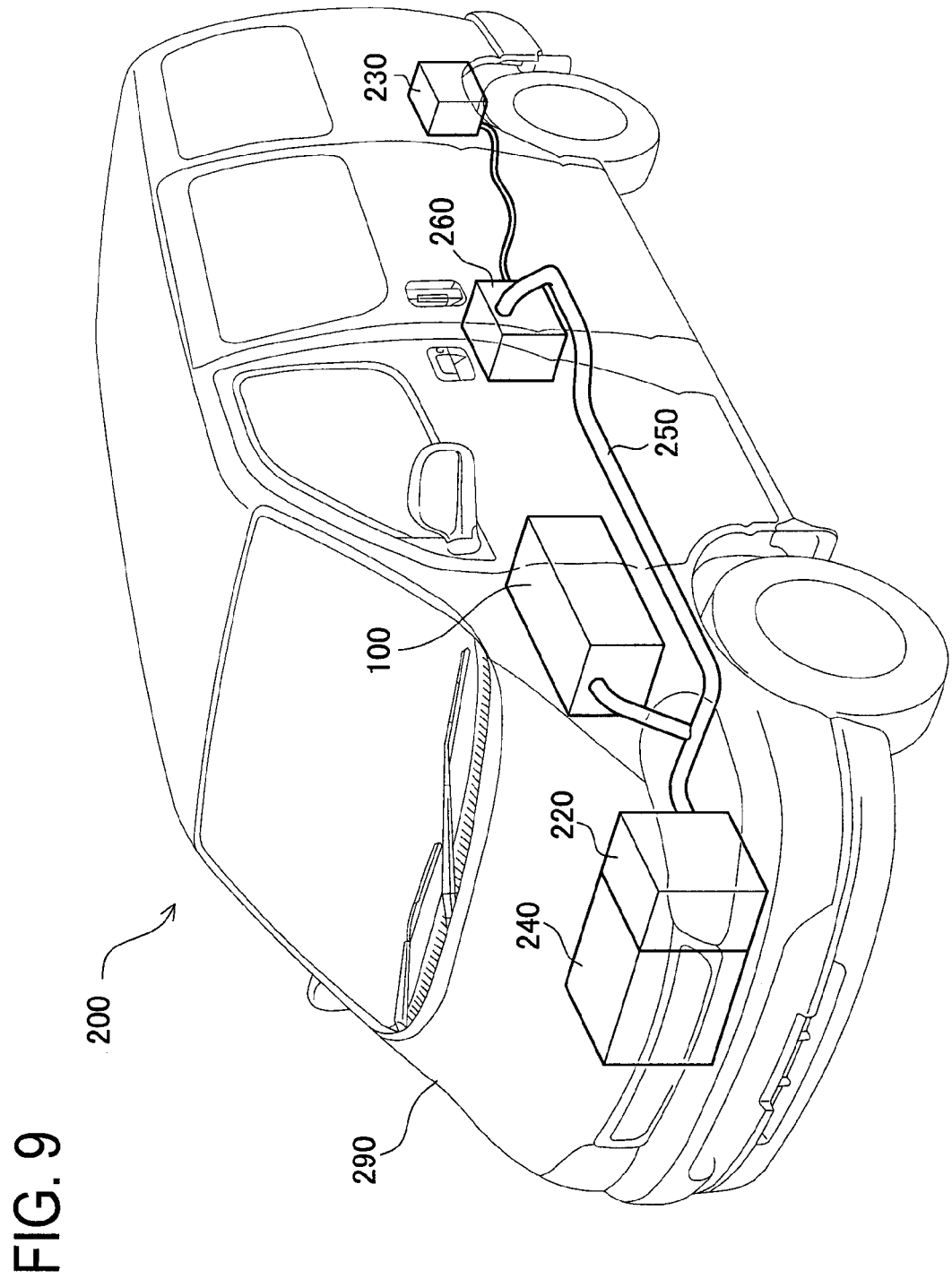
FIG. 9 is an explanatory view showing a vehicle using the secondary batteries in the embodiment.

For example, the battery pack 100 can be mounted and used in a vehicle 200 as shown in FIG. 9. This vehicle 200 is a hybrid electric vehicle to be driven by an engine 240, a front motor 220, and a rear motor 230 in combination. This vehicle 200 includes a vehicle body 290, the engine 240, the front motor 220 attached to the engine 240, the rear motor 230, a cable 250, an inverter 260, and the battery pack 100 internally containing the plurality of secondary batteries 10.

The vehicle may be any vehicle using electric energy obtained from batteries as the whole or a part of a power source. For example, the vehicle may include an electric vehicle, a hybrid electric vehicle, a plug-in hybrid electric vehicle, a hybrid railway vehicle, a fork lift, an electric wheel chair, an electric assist bicycle, and an electric motor scooter.

The battery pack 100 can also be used in a battery mounting device as shown in FIG. 10. This figure shows a hammer drill 300 mounting the battery pack 100 containing the secondary batteries 10 in this embodiment. This hammer drill 300 is a battery mounting device including the battery pack 100 and a main body 320. The battery pack 100 is detachably contained on a bottom 321 of the main body 320 of the hammer drill 300.

As the battery mounting device, any device may be adopted if only it mounts a battery and utilize it as at least one of energy sources. For example, it may include various home electric appliances, office equipment, and industrial equipment to be driven by batteries such as a personal computer, a cell phone, a battery-driven electric tool, and an uninterruptible power source. Besides the battery pack 100, the battery mounting device may also include a device to be driven by cells which are not in an assembled state.

The above embodiment is merely an example and does not limit the invention. Thus, the invention may be embodied in other specific forms without departing from the essential characteristics thereof.

For instance, a flat surface of a safety valve is not limited to a rectangular shape shown in the figures. Alternately, the flat surface may be of any shape such as circular, elliptic, and square shapes. In any case, a cleavable groove is provided in the flat surface. Further, a flat surface of the measuring groove 24 is not limited to the almost circular shape as shown in the figures but may be any other shape. Moreover, the measuring grooves 24 may be formed on the four oblique grooves 23, respectively. In such the case, the same effect with the above embodiment can be obtained.

In the present embodiment, the depth of the cleavable groove 21 including the measuring grooves 24 is uniform. Alternately, only the measuring groove may be a stepped portion to some degree. For example, the measuring groove may be formed slightly shallower compared to other portions of the cleavable groove to an extent not influencing the valve opening pressure. It is however necessary that the measuring grooves and other portions of the cleavable groove are formed by a single punch and the difference of the depth of those portions are known. The safety valve 18 in this embodiment is formed in the closing plate 12. Alternately, the safety valve may be formed in the case body 13 of the battery case 11. The shape of the battery case 11 is not limited to the shape shown in the figures.

REFERENCE SIGNS LIST

10 Secondary battery
12 Closing plate
18 Safety valve
21 Cleavable groove
24 Measuring groove
31 Punch
32 Center protrusion
34 Measuring protrusion

The invention claimed is:

1. A sealed battery containing a power generating element in a battery case, wherein:
 the battery case includes a safety valve provided with a cleavable groove,
 the cleavable groove is partly formed with a measuring groove in a longitudinal direction, wherein the measuring groove:
  has a width wider than other portions of the cleavable groove, and
  has a depth substantially equal to a depth of other portions of the cleavable groove,
 the cleavable groove includes a center groove extending in the longitudinal direction and two inversely placed Y-shaped grooves extending from both ends of the center groove, and
 the measuring groove is substantially circular and provided at two positions separated from each other in the center groove.

* * * * *